UNITED STATES PATENT OFFICE 2,435,790

CYANOSTYRENE COPOLYMERIZED WITH BUTADIENES

John R. Long, Stow, Ohio, assignor to Wingfoot Corporation, Akron, Ohio, a corporation of Delaware No Drawing. Application April 15, 1943,
Serial No. 483,177

4 Claims. (Cl. 260—86.5)

This invention relates to polymers of the ring-substituted cyanostyrenes, and more particularly to copolymers of these cyanostyrenes with other monomeric substances.

Many substances have been proposed for polymerization into useful plastic masses, particularly when interpolymerized with other monomeric substances. In the course of investigations looking to the provision of additional substances of this type, the cyanostyrenes in which the nitrile radical is substituted in the ring have been discovered. These compounds may be described as vinyl benzenes having a nitrile group in the ring either ortho, para, or meta to the vinyl group. For example, ortho-cyanostyrene has the formula:

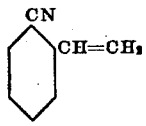

These compounds may be prepared by halogenating the side chain of an ethyl benzonitrile and then pyrolyzing the resulting chlorethyl benzonitrile to give the corresponding cyanostyrene. The reactions are indicated by the following equations:

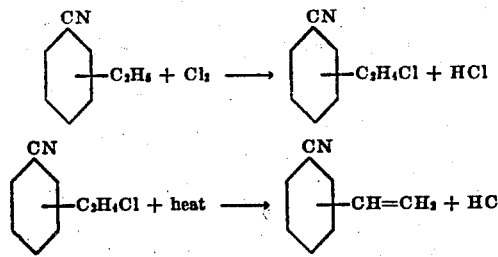

The process is performed by reacting less than one mol of chlorine or other halogen, such as bromine, with one mol of the ethyl benzonitrile to bring about substitution in the side chain. This is preferably done at a temperature of 70° to 120° C. and in the presence of ultra-violet light. Less than one equivalent of the chlorine is provided in order to avoid the introduction of two halogen radicals in the side chain. The unreacted ethyl benzonitrile is then separated from the chlorethyl benzonitrile by fractional distillation under reduced pressure.

The product of the previous reaction, chlorethyl benzonitrile, is then pyrolyzed to split out halogen chloride and obtain the corresponding ring-substituted cyanostyrene. This pyrolysis may be carried out at a temperature between about 500° and 700° C., but preferably, 500° to 600° C. and the product removed from the zone of reaction as promptly as possible. Also, the best practice is to cool the vapors containing the cyanostyrene immediately after the pyrolysis has taken place, and the presence of a polymerization inhibitor, such as hydroquinone or N-diphenyl para phenylene diamine, in the receiver also helps to prevent premature polymerization of the cyanostyrene.

The splitting out of halogen halide in the pyrolysis is not always complete, and therefore, the crude cyanostyrene is fractionated under reduced pressure, preferably below 140 mm./Hg, to separate the cyanostyrene from the haloethyl benzonitrile.

The final product, a cyanostyrene in which the nitrile group is substituted in the ring, may be readily polymerized, either by itself, or with other monomeric materials, to give plastic masses. In general, it may be used to replace styrene to give copolymers which have as good tensile strength as those prepared with styrene, but are more resistant to gasoline. Especially useful copolymers may be prepared with a conjugated diene hydrocarbon in various proportions, for example, those ranging by weight from twenty to eighty parts of the diene, and correspondingly, from eighty to twenty parts of the cyanostyrene in one hundred parts of total monomers. Among others, copolymers of ortho, meta, or paracyanostyrene with the following may be prepared: Butadiene-1,3, isoprene, and 2,3 dimethyl butadiene-1,3.

To illustrate the process from the halogenation of the ethyl benzonitrile through to the preparation of copolymers from the cyanostyrenes, the following examples are given, but it will be understood that no limitation is intended thereby.

Example 1

Chlorine was bubbled slowly into 80.0 grams of o-ethyl benzonitrile at a temperature of 100–115° C. and in the presence of a 100-watt mercury arc lamp until the increase in weight was 17.0 grams. The crude product was fractionated at reduced pressure to give 28.2 grams starting material, 55.5 grams o-chlorethyl benzonitrile and a small residue. The desired product distilled mostly at 105–110° C. at 5 mm./Hg.

Example 2

Chlorine was bubbled slowly into 217.8 grams of p-ethyl benzonitrile at a temperature of 90–110° C. in the presence of a 100-watt mercury arc lamp until the increase in weight was 24.4 grams.

The crude product was fractionated at reduced pressure to give 141.8 grams of starting material and 88.7 grams of p-chlorethyl benzonitrile, B. P. 118–125° C. at 5 mm./Hg.

*Example 3*

The pyrolysis tube was a 25 mm. (I. D.) Pyrex tube filled with ¼ inch clay saddles and heated at 570–590° C. in a vertical 2½ ft. electrically heated furnace. The receiver at the bottom contained some hydroquinone and was placed in ice water.

109.7 grams o-chlorethyl benzonitrile was passed through the above pyrolysis tube at a pressure of 180–250 mm. in an hour and twenty-five minutes. The crude product was fractionated at reduced pressure to give 37.0 grams of o-cyanostyrene, B. P. 96–100° C. at 9 mm., and 26.2 grams starting material. The product had a density of $d_{15}^{29}=1.012$. Percent N, calculated=10.85; found 10.78; 10.90.

*Example 4*

The pyrolysis set-up was the same as in Example 3. 222.0 grams p-chlorethyl benzonitrile was passed through the furnace at a rate of 3.0 grams per minute at a pressure of 350–400 mm. The unreacted p-chlorethyl benzonitrile was separated by fractionation and passed through the furnace again. This was repeated. The combined crude products were fractionated at reduced pressure to give 93.7 grams of p-cyanostyrene, B. P. 85° C. at 5 mm. to 86° C. at 4 mm. $d_{15}^{29}=1.0005$. Per cent N, calculated=10.85; found 10.67; 10.69.

*Example 5*

A mixture of 9.6 grams of butadiene and 6.4 grams of o-cyanostyrene was emulsified in an aqueous solution containing 10 c. c. 6% Duponol (Na alkyl sulphonates) 10 c. c. of a McIlvaine buffer (phosphate-citrate) to give a pH of the latex of 6.65, 0.48 gram of $CCl_4$, 0.5 c. c. of 5% NaCN, 0.5 c. c. of 10% acetaldehyde and 0.266 gram of sodium perborate. The emulsion was tumbled for 22 hours at 38° C. The polymer was coagulated with alcohol, washed and dried. A fairly tough polymer in yield above 90% was obtained.

*Example 6*

A mixture of 151.5 grams of butadiene and 101 grams of o-cyanostyrene was emulsified in an aqueous solution containing 156 c. c. of 6% Duponol, 150 c. c. of McIlvaine buffer to give a latex pH of 8.25, 7.2 g. of $CCl_4$, 7.5 c. c. of 5% NaCN, 7.5 c. c. of 10% acetaldehyde and 4.0 grams of sodium perborate. The emulsion was tumbled for 25 hours at 38° C. The polymer was coagulated with alcohol, washed and dried, a high yield being obtained. When compounded and cured it had as high a tensile strength as the corresponding styrene-butadiene copolymer and was more resistant to gasoline than the styrene-butadiene copolymer.

*Example 7*

The same charge as Example 6 was used, except the monomers which were 89 grams p-cyanostyrene and 133 grams butadiene. The emulsion was tumbled for 20 hours. The polymer was coagulated with alcohol, washed and dried, a good yield being obtained. When compounded and cured the polymer had as high a tensile strength as the corresponding styrene-butadiene copolymer and was more resistant to gasoline than the styrene-butadiene-1,3 copolymer.

As mentioned above, copolymers of ortho, para, or meta-cyanostyrene with various other monomeric materials may be prepared, the method outline in Examples 5, 6, and 7 being followed or the emulsion polymerization may be modified in various respects as applied in the prior art to copolymerizations in general. For example, the temperature of polymerization may vary from 30° to 50° C. or even higher, although temperatures from 38° to 50° C. are preferred.

The above-mentioned cyanostyrenes may be copolymerized with various conjugated diene hydrocarbons such as butadiene-1,3, isoprene, and 2,3-dimethyl butadiene-1,3. Also, the cyanostyrene may be used to replace a portion of the styrene in styrene copolymers, the result being a three-component system containing the cyanostyrene, styrene, and a conjugated diene hydrocarbon, e. g., para-cyanostyrene, styrene, and butadiene-1,3.

The proportions used in the various copolymers may be selected over a wide range. Preferably, the cyanostyrene constitutes from 20% to 80% by weight of the total monomers and, in three-component systems, the cyanostyrene may replace from 10% up to nearly 100% of the styrene.

While there have been described above the preferred embodiments of the invention, it will be apparent to those skilled in the art that various modifications and changes may be made therein without departing from the spirit of the invention or the scope of the appended claims.

I claim:

1. A copolymer of from 20 to 80 percent of ortho-cyanostyrene and from 20 to 80 percent of butadiene-1,3.

2. A copolymer of from 20 to 80 percent of para-cyanostyrene and from 20 to 80 percent of butadiene-1,3.

3. A copolymer of from 20 to 80 percent of meta-cyanostyrene and from 20 to 80 percent of butadiene-1,3.

4. A copolymer of from 20 to 80 percent of a compound of the group consisting of butadiene-1,3, isoprene and 2,3-dimethyl-butadiene-1,3 and from 20 to 80 percent of a compound having the structural formula:

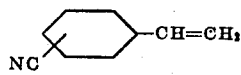

JOHN R. LONG.

REFERENCES CITED

The following references are of record in the file of this patent:

UNITED STATES PATENTS

| Number | Name | Date |
|---|---|---|
| 2,305,025 | Muhlhausen | Dec. 15, 1942 |
| 2,332,899 | D'Alelio | Oct. 26, 1943 |

FOREIGN PATENTS

| Number | Country | Date |
|---|---|---|
| 115,688 | Australia | Aug. 20, 1942 |

OTHER REFERENCES

Davies, J. Chem. Soc. 1939, pages 357–60; Chem. Abstr., vol. 33, 1939, pages 4210, 1939.

Helberger Annalen, vol. 531, 1937, pages 279–287. Chem. Abstr., vol. 32, 1938, page 181.